United States Patent

Kato et al.

Patent Number: 5,974,221
Date of Patent: Oct. 26, 1999

[54] PLAYBACK DEVICE

[75] Inventors: Naoki Kato, Tokyo; Hiroshi Tajiri; Yoshio Nishimura, both of Hyogo, all of Japan

[73] Assignee: Mitsubishi Denki Kabushiki Kaisha, Tokyo, Japan

[21] Appl. No.: 08/962,334

[22] Filed: Oct. 31, 1997

[30] Foreign Application Priority Data

Nov. 1, 1996 [JP] Japan ................................. 8-291996

[51] Int. Cl.$^6$ ....................................................... H04N 5/91
[52] U.S. Cl. ................................. 386/68; 386/80; 386/66
[58] Field of Search ............................... 386/85, 87, 88, 386/13, 14, 16, 61, 66, 71, 84, 12, 80, 113, 21; H04N 5/91

[56] References Cited

U.S. PATENT DOCUMENTS 5,687,037  11/1997  Jung ........................................... 386/80

FOREIGN PATENT DOCUMENTS 575971   3/1993   Japan .
795614   4/1995   Japan .

Primary Examiner—Robert Chevalier

[57] ABSTRACT

A playback device has a head provided on a rotary drum to read signals recorded on a tape to produce a playback signal, and a playback signal processor for processing the playback signal. The playback device also includes a timing generator for generating a sync signal used in a varied-speed playback in which playback is performed at a speed different from a speed used for normal playback; a selector for selecting the sync signal between one for the normal playback and one for the varied-speed playback; and a drum rotation controller using the sync signal generated by said timing generator as a reference signal for the rotation of the rotary drum during varied-speed playback. With the above configuration, the vertical and horizontal sync signals supplied to the monitor are maintained to have a constant period. As a result, the resultant images on the monitor are free from disturbances, and it is possible to avoid muting.

9 Claims, 11 Drawing Sheets

PLAYBACK DEVICE

BACKGROUND OF THE INVENTION

The present invention relates to a playback device for playing back video information recorded on a magnetic tape by a helical-scanning method, and in particular to reduction of disturbances in an image in varied-speed playback (playback at a speed different from that for normal playback).

First, the operation of a conventional VTR, which is a typical helical scan playback device, in combination with a display device of a consumer television set will be described.

An ordinary consumer television set of the NTSC system, the PAL system or the like has such a characteristics as to achieve proper display even if there is a relatively greater offset in the vertical sync signal frequency, but to require that the offset in the horizontal sync signal frequency variation is small. In other words, the permissible range of the vertical sync signal frequency variation is wide, while the permissible range of the horizontal sync signal is narrow.

Accordingly, the setting of the system is such that in the varied-speed playback (fast forward, slow, or reverse playback), change in the horizontal sync signal frequency is restrained to a minimum.

When the tape transport speed is altered from that for the normal playback to that for varied-speed playback, the rotational speed of the rotary drum 9 is changed to counteract the change in the tape transport speed, such that the horizontal sync signal has a frequency identical to the horizontal sync signal in the normal playback.

During fast forward playback (hereinafter sometimes referred simply as "fast playback"), for instance, if the rotational speed of the drum 9 were the same as in the normal playback, the period of the horizontal sync signal would be shortened due to the increase in the tape transport speed. To prevent the period of the horizontal sync signal from becoming short, the rotational speed of the drum 9 is increased by, for example, decreasing the divisor (division ratio) of the control reference clock. Accordingly, the vertical sync signal is output at an interval shorter than that during normal playback, because of the increase in the drum rotational speed. (It is to be noted that the horizontal sync signal frequency is dependent on the relative speed of the head on the drum and the tape, while the vertical sync signal frequency is dependent only on the rotational speed of the drum.)

Thus, the frequency of the horizontal sync signal of the video signal during fast playback is identical to that in the normal playback, while the period of the vertical sync signal is lowered according to the lowering of the drum rotational speed.

Next, description is made of a situation where the output signal from the playback device is supplied to a display monitor of a personal computer, or a like information processing unit, and a VGA (video graphic array) signal is used.

FIG. 14 shows the playback device provided with a converter unit for converting the signal between different formats and different definitions and for producing a signal suitable for a personal computer, work station or the like. Particularly, the routes for the sync signals separated from the playback signal and supplied to the monitor are shown.

A head 10 on a rotary drum 9 is for reading the signal having been helical-scan-recorded on a magnetic tape 8. A drum rotation controller 11 is for controlling the speed and phase of rotation of the rotary drum 9. A playback signal processor 12 processes the signal having been picked up by the head 10. A sync separator 13 separates the horizontal sync signal H-sync2' and vertical sync signal V-sync1' from the video signal supplied from the playback signal processor 12. A buffer memory 14 temporarily stores the video signal.

A voltage-controlled oscillator (VCO) 16 oscillates at a frequency which is controlled in accordance with a voltage signal from a phase comparator 17. A 910-frequency divider 18 frequency-divides the output of the VCO 16 by a divisor 910, and produces a horizontal sync signal H-sync1' of 31.5 kHz. A 2-frequency divider 15 frequency-divides the output of the 910-frequency divider 18 by a divisor "2," to produce a signal having a frequency 15.75 kHz, which is equal to the frequency of H-sync2'. The phase comparator 17 compares the phase of the output of the 2-frequency divider 15 with the phase of the horizontal sync signal output from the sync separator 13, and produces the error voltage signal indicative of the phase difference.

The VCO 16, the phase comparator 17, the 910-frequency divider 18, and the 2-frequency divider 15 in combination form a PLL 20. The output of the VCO 16 serves as a system clock used in the playback device.

A display controller 19 controls the display monitor in accordance with the video signal and sync signals.

A memory controller 4 controls the buffer memory 14 such that the playback video signal output from the playback signal processor 12 is written into the memory 14 using H-sync2' from the sync separator 13 as a timing signal, and the video signal stored in the memory 14 is read using H-sync1' from the PLL 20 as a timing signal. The video signal read from the buffer memory 14 is supplied to the monitor via the display controller 19.

The V-sync1' during varied-speed playback has a period which is different from that of the vertical sync signal during normal playback, due to the change in the speed of the drum rotation.

A display monitor for use with a personal computer or the like displays an image only when the video signal has stable horizontal and vertical sync signals. Such stable sync signals are obtained when, for instance, the original digital video signals are D/A-converted. Most personal computers are designed to cope with a plurality of combinations of vertical and horizontal sync signals, and are designed such that when the frequencies of the sync signals are varied during display, it is detected by a sync frequency testing system, the display monitor mutes (stops displaying) the video signal, and resumes the display after both the vertical and horizontal sync signals are stabilized. This is to avoid problems associated with the sudden change in the scanning pattern.

When the VTR described above is connected with a monitor of a personal computer or the like, and there is a transition in the playback speed (as is the case at the time of transition from the normal playback to a varied-speed playback), the monitor cannot display the varied-speed playback image because of the image muting or the disturbances of the images.

Thus, a problem with a conventional playback device described above is that when the playback speed is changed and accordingly the frequencies of the sync signals are changed, a monitor for use with a personal computer or the like cannot display an image, or the reproduced image is disturbed. This is because the basic specification of a display monitor is such as to display the image signal with stable sync signals, and permissible disturbances or offset in the frequency of the sync signal are limited.

SUMMARY OF THE INVENTION

The invention has been conceived in order to solve the problems described above, and its object is to provide a playback device which is capable of producing the vertical and horizontal sync signals at a predetermined frequency or period even when there is a transition from the normal playback to a varied-speed playback, and is free from disturbances in the playback image on the monitor and muting of the image at the transition.

According to the invention, there is provided a playback device comprising:

a head provided on a rotary drum to read signals recorded on a tape to produce a playback signal;

a playback signal processor for processing the playback signal;

a timing generator for generating a sync signal used in a varied-speed playback in which playback is performed at a speed different from a speed used for normal playback;

a selector for selecting the sync signal between one for the normal playback and one for the varied-speed playback; and a drum rotation controller using the sync signal generated by said timing generator as a reference signal for the rotation of the rotary drum during varied-speed playback.

With the above configuration, the vertical and horizontal sync signals supplied to the monitor are maintained to have a constant period. As a result, the resultant images on the monitor are free from disturbances, and it is possible to avoid muting.

The sync signal generated by the timing generator may include a vertical sync signal, and the drum rotation controller may be adapted to cause the rotation phase of the rotary drum to match the phase of the vertical sync signal generated by said timing generator during the varied-speed playback.

With the above arrangement, the rotation phase of the drum is made to match with the vertical sync signal generated in the timing generator, so that the disturbances in the image and the muting can be avoided.

The playback device may further comprise a memory, and a memory controller for controlling the memory such that the video signal output from the playback signal processor is written into the memory using the sync signal separated from the playback video signal as a timing signal, and the reading from the memory is effected using the sync sync signal generated by the timing generator.

With the above arrangement, the time base for the display can be made constant.

The playback device may further comprise means for causing the phase of the sync signal used to control the rotation of the drum to match the phase of the sync signal separated from the playback video signal before the transition from the normal playback to the varied-speed playback.

With the above arrangement, it is possible to avoid the disturbances and muting immediately after the transition from the normal playback to the varied-speed playback.

The playback device may further comprise a memory, a rotation position sensor at the rotation part of the rotary drum, and a memory controller for controlling the memory such that the video signal output from to the playback signal processor is written into the memory using the output of the rotary position sensor as a timing signal.

With the above arrangement, the output of the rotary position sensor is used as a timing signal for writing into the memory, and the writing timing can therefore be controlled appropriately.

It may be so arranged that the playback signal is an interlace signal of which each frame is formed of a first field and a second field, said playback device further comprises a reading timing adjusting means for varying the timing of the vertical sync signal for the second field relative to the vertical sync signal for the first field so as to make the beginning of the picture information part of the second field to match with the beginning of the picture information part of the first field.

With the above arrangement, blur in the image can be eliminated.

It may be so arranged that timing of the sync signals generated for the second field in each frame is initially set at a mid-point between the sync signals of the first field of the frame to which said second field belongs, and the sync signal of the first field of the next frame, and said timing is adjustable.

With the above arrangement, the display of the image is ensured regardless of the type of the monitor used.

The playback device may further comprise means for generating a clock signal which is in synchronism with the phase and frequency of the playback horizontal sync signal whose frequency varies with the variation of the speed at which the tape is reproduced, and said means for generating the clock signal may comprise:

a voltage-controlled oscillator for producing the clock signal;

a frequency divider for frequency-dividing the clock signal output from the voltage-controlled oscillator to produce a second horizontal sync signal; and a phase comparator for producing a voltage signal indicating the phase difference between the second horizontal sync signal of the frequency divider and the playback horizontal sync signal;

an offset adder for applying an offset to the output of the phase comparator; and means for varying the offset according to the playback speed.

With the above arrangement, even when the varied-speed playback speed is very different from the normal playback speed, accurate control for synchronization is ensured, and disturbances in the playback signal is reduced.

DETAILED DESCRIPTION OF THE PREFERRED EMBODIMENTS

Embodiments of the invention will now be described with reference to the drawings.

Embodiment 1

Figure 1:
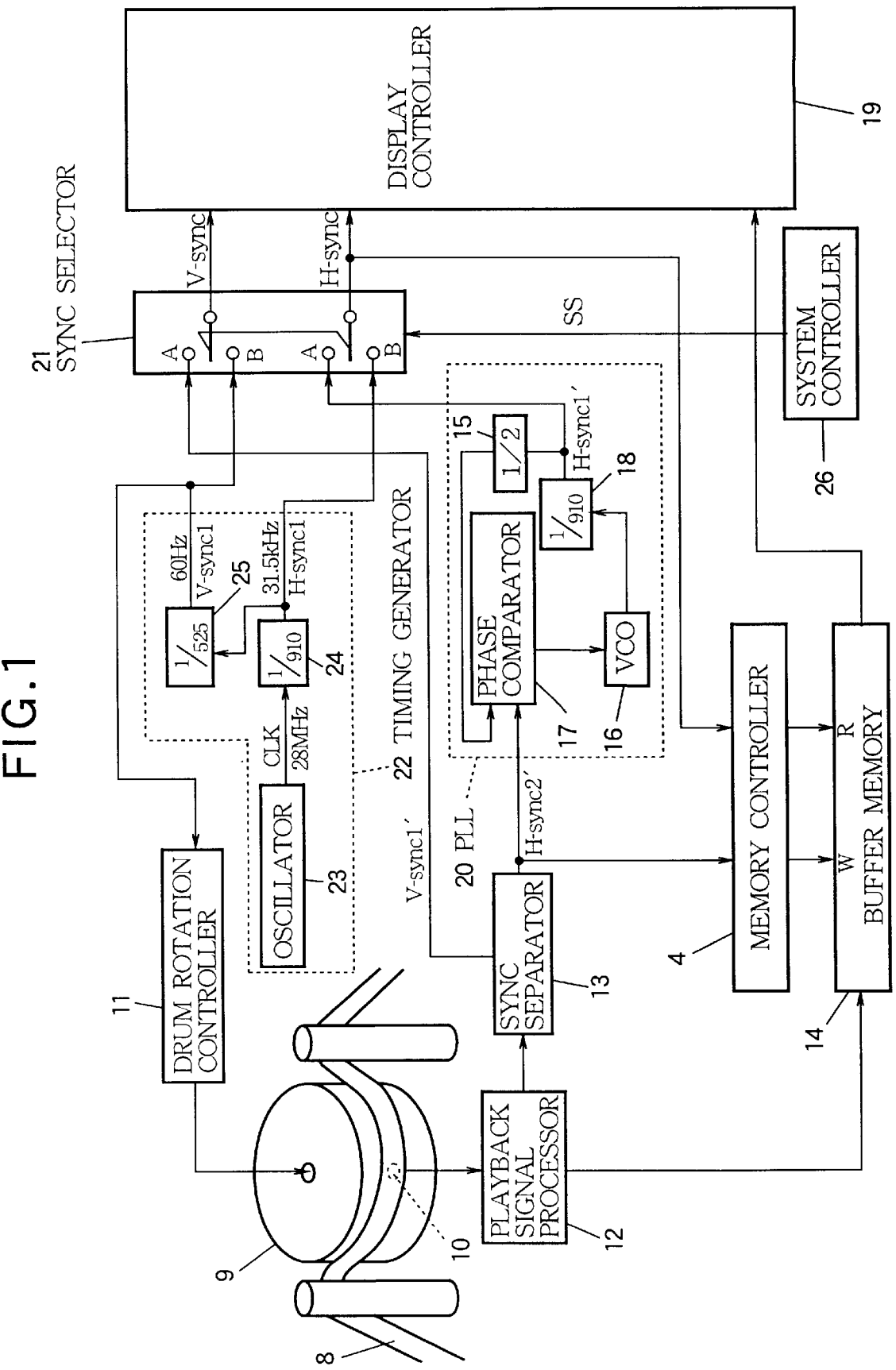
FIG. 1 is a block diagram showing a playback device of Embodiment 1 of the invention.

FIG. 1 is a block diagram showing the configuration of a playback device of Embodiment 1 of the invention. The reference numerals identical to those in FIG. 14 denote identical or corresponding elements.

A head 10 on a rotary drum 9 is for reading the signal having been helical-scan-recorded on a magnetic tape. A drum rotation controller 11 controls the rotational speed and the rotational phase of the drum 9. A playback signal processor 12 processes the signal picked up by the head 10. A sync separator 13 separates the horizontal sync signal H-sync2' and vertical sync signal V-sync1' from the video signal supplied from the playback signal processor 12. A buffer memory 14 temporarily stores the video signal from the playback signal processor 12.

A memory controller 4 controls the buffer memory 14 such that the video signal output from the playback signal processor 12 is written into the memory 14 using H-sync2' from the sync separator 13 as a timing signal, and the video signal stored in the memory 14 is read using H-sync from a sync selector 21, to be described later, as the timing signal.

A voltage-controlled oscillator (VCO) 16 oscillates at a frequency which is controlled in accordance with a voltage signal from a phase comparator 17. The reference frequency of the VCO 16 is 28 MHz. A 910-frequency divider 18 frequency-divides the output (clock) from the VCO 16 by a divisor 910, to produce a horizontal sync signal H-sync1' having a frequency 31.5 kHz. A 2-frequency divider 15 frequency-divides the output of the 910-frequency divider 18 by a divisor "2," to produce another sync signal having a frequency 15.75 kHz, which is equal to the frequency of H-sync2'. The phase comparator 17 compares the phase of the output of the 2-frequency divider 15 with H-sync2' from the sync separator 13, and produces the error voltage signal indicative of the phase difference. The error voltage signal is supplied to the VCO 16. The VCO 16, the phase comparator 17, the frequency-divider 18, and the 2-frequency divider 15 in combination form a PLL 20. The output of the VCO 16 serves as a system clock in the playback device.

A display controller (VGA) 19 controls the monitor in accordance with the video signal (read from the buffer memory 14) and the sync signals.

A timing generator 22 generates a sync signal suitable for the display controller 19.

The timing generator 22 comprises an oscillator (CLK) 23 for generating a clock of 28 MHz, a 910-frequency divider 24 frequency-dividing the clock by a divisor 910 to produce a horizontal sync signal H-sync1 of 31.5 kHz, and a 525-frequency divider 25 for frequency-dividing H-sync1 by a divisor 525 to produce a vertical sync signal V-sync1 of 60 Hz.

The sync selector 21 selects the vertical and horizontal sync signals, V-sync1 and H-sync1, output from the timing generator 22 during varied-speed playback. During normal playback, the sync selector 21 selects V-sync1' output from the sync separator 13 and H-sync1' output from the PLL 20. The selection is made in accordance with a sync selection signal SS supplied from a system controller 26 of the playback device. The system control 26 performs the overall control over the playback device. The outputs of the sync selector 21, denoted by V-sync and H-sync, are is supplied to the display controller 19.

Figure 14:
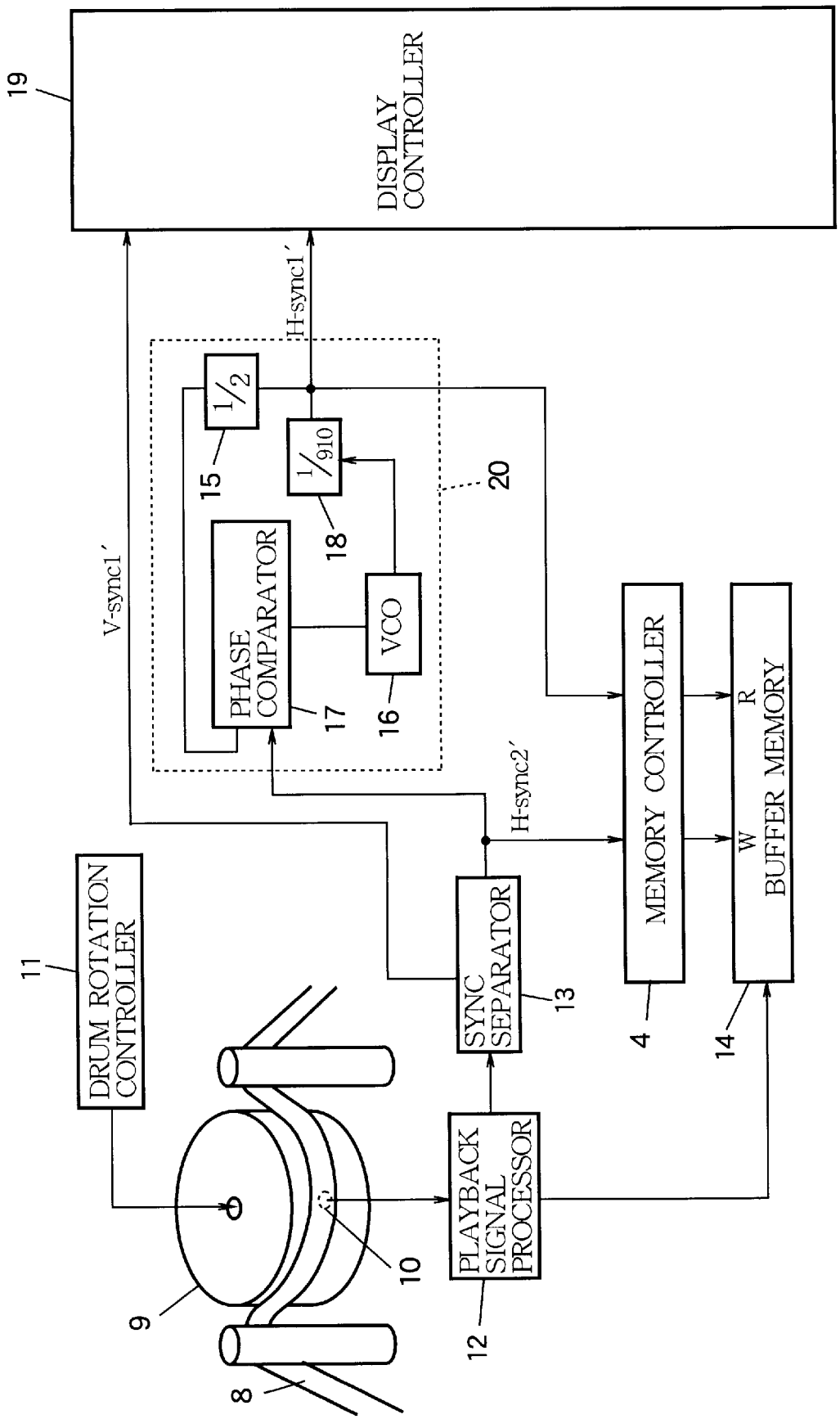
FIG. 14 is a block diagram showing a conventional playback device.

Thus the configuration of the playback device of Embodiment 1 differs from the playback device shown in FIG. 14 in that the sync selector 21 and the timing generator 22 are added.

The operation of the playback device shown in FIG. 1 is as follows.

It is assumed that the playback video signal reproduced from the magnetic tape is an NTSC signal, and the display signal supplied to the monitor is a VGA signal which is typical of the video signals for use in personal computers, and the former is to be converted into the latter.

The specifications of the VGA and NTSC signals are assumed to be as follows.
VGA signal:
horizontal sync signal 31.5 kHz
vertical sync signal 60 Hz
non-interlace
dot clock: 25 MHz
NTSC signal:
horizontal sync signal 15.75 kHz
vertical sync signal 60 Hz
interlace
dot clock 14 MHz The timing generator 22 produces sync signals V-sync1 and H-sync1 suitable for the display controller 19. Specifically, the clock generated by the stable oscillator 23 is frequency-divided at the 910-frequency divider 24 by a divisor 910 to produce the horizontal sync signal, H-sync1, of 31.5 kHz, and H-sync1 from the 910-frequency divider 24 is frequency-divided at the 525-frequency divider 25 by a divisor 525 to produce a vertical sync signal, V-sync1, of 60 Hz.

During normal playback, the sync selection signal SS causes the sync selector 21 to select the inputs at side A, and the sync signals H-sync and V-sync supplied to the monitor via the display controller 19 are H-sync1' and V-sync1'. That is, V-sync1' separated at the sync separator 13 and H-sync1' produced from the PLL 20 are supplied to the display controller 19.

During varied-speed playback (fast playback, slow playback, or reverse playback), the sync selection signal SS causes the sync selector 21 to select the inputs at side B, and H-sync1 and V-sync1 generated at the timing generator 22 are supplied to the display controller 19.

As a result, it is ensured that the vertical sync signal (60 Hz) and the horizontal sync signal (31.5 kHz) according to the VGA signal standard is supplied to the monitor regardless of whether the playback device is performing normal playback or varied-speed playback. Thus, the horizontal sync signal has a stable period and matches with the monitor, even during varied-speed playback.

H-sync output from the sync selector 21 is also supplied to the buffer memory 14, and used as the timing signal for reading from the buffer memory 14. As a result, reading from the buffer memory 14 is performed in synchronism with H-sync1' during normal playback, and in synchronism with H-sync1 during varied-speed playback.

Writing into the buffer memory 14 is effected in time with H-sync2' separated from the video signal at the sync separator 13 during normal playback as well as varied-speed playback.

The V-sync1 output from the 525-frequency divider 25 is also supplied to the drum rotation controller 11 as a reference signal for the control over rotation phase of the drum 9 during varied-speed playback. As a result, the drum motor (not shown) rotates in phase with V-sync1, and the period of the video signal is identical with that of V-sync1.

Although V-sync1 is supplied to the drum rotation controller 11 also during the normal playback, it is not used for control over the drum rotation during the normal playback.

The playback video signal from the head 10 is demodulated at the playback signal processor 12 into a demodulated video signal. The vertical sync signal V-sync1' and the horizontal sync signal H-sync2' are separated from the demodulated video signal at the sync separator 13.

The drum rotation correction for eliminating the variation in the horizontal sync signal frequency, shown in and described in connection with FIG. 14, is not effected, so that H-sync2' has a period a little different from that of the NTSC horizontal sync signal (15.75 kHz).

The writing into the buffer memory 14 is effected in accordance with H-sync2' output from the sync separator 13, and the reading is effected in accordance with H-sync1 generated at the timing generator 22 during varied-speed playback. Accordingly, the horizontal period is converted, and the signals read from the buffer memory 14 have a horizontal period different from that of the standard VGA signal.

Figure 2:
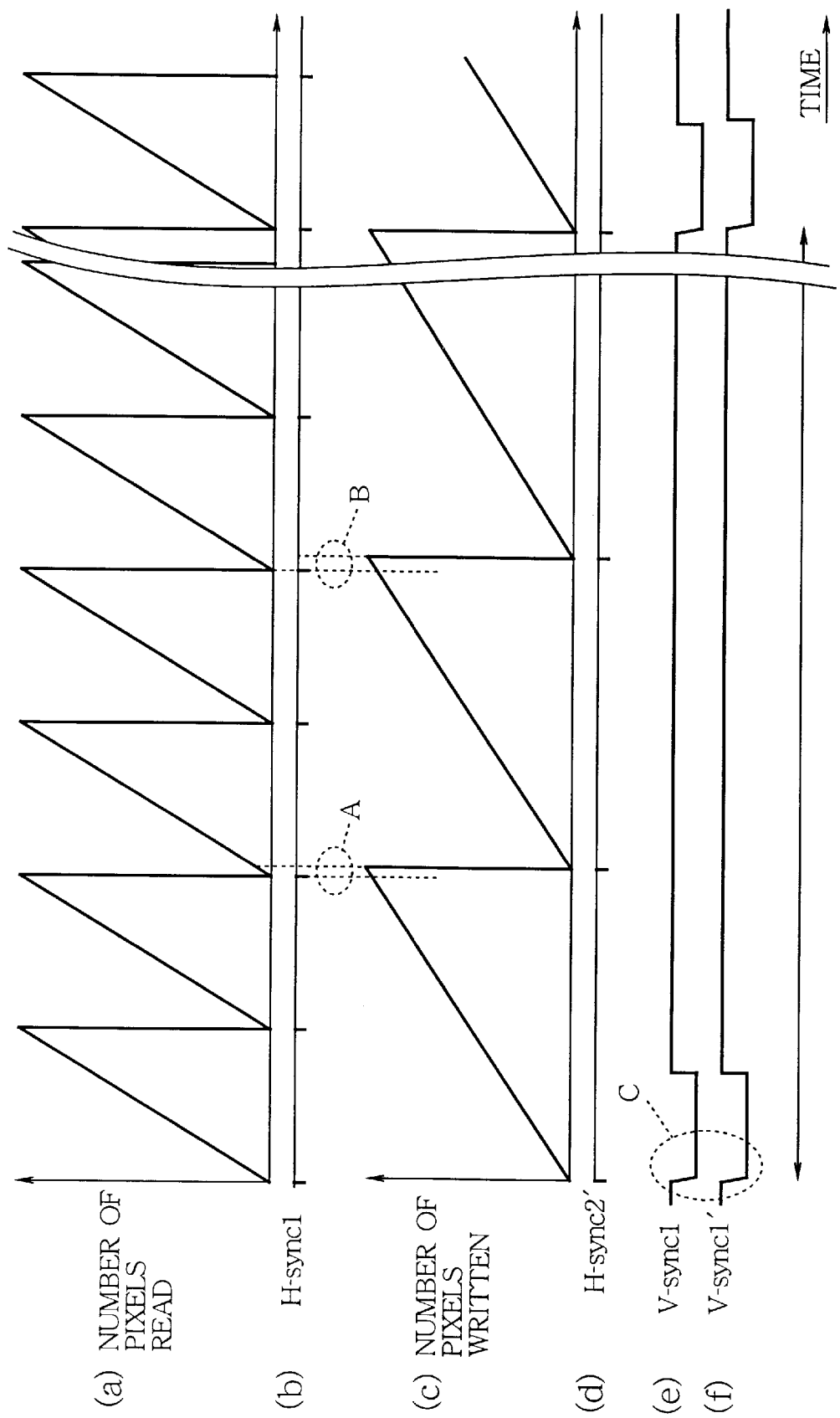
FIG. 2(a) to FIG. 2(f) are time charts showing the timings of the various sync signals, and writing into a memory and reading from the memory in Embodiment 1.

The H-sync2' and H-sync1 are asynchronous as shown at part A and part B in FIG. 2, which shows the number of pixels read from the buffer memory 14 at (a), H-sync1 at (b), the number of pixels written into the buffer memory 14 at (c), H-sync2' at (d), V-sync1 at (e), and V-sync1' at (f).

The rotation of the rotary drum 9 however is in synchronism with V-sync1, so that V-sync1' output from the sync separator 13 is in synchronism with V-sync1, as shown at part C in FIG. 2. Accordingly, H-sync2' and H-sync1 coincide with each other at the beginning of each vertical period. Because the frequency of H-sync2' is about half the frequency of H-sync1, the timing of H-sync2' is kept to correspond substantially to the timing of H-sync1. In other words, the correspondence between the input horizontal lines and the output horizontal lines are substantially preserved. Accordingly, the image can be constructed from the horizontal line video output.

This is because, the NTSC horizontal sync frequency is 15.75 kHz which is half the horizontal sync frequency of the VGA signal, which is 31.5 kHz, and by reading the signal at a frequency twice the frequency of the writing, the NTSC-VGA horizontal sync signal conversion is effected. That is, by setting the timings of the writing into and reading from the buffer memory 14, as described above, the time base correction is effected, and the image is constructed by the horizontal line video output.

The vertical and horizontal sync signals are obtained by frequency-dividing a stable clock generated by internal oscillation, i.e., at a circuit independent of the drum rotation. Accordingly, even if the timing of the writing is varied due to change in the playback speed, the reading timing is unaffected, and the timing of the image output is constant.

As has been described, according to the playback device of Embodiment 1, the sync selector 21 selects the sync signal depending on whether the normal playback is effected or a varied-speed playback is effected, and the rotation of the drum 9 is controlled to be in phase with the vertical sync signal generated at the timing generator 22 during the varied-speed playback. The vertical and horizontal sync signals supplied to the monitor during varied-speed playback are the sync signals generated from the output of the stable oscillator, and no disturbances of the sync signal appear on the input to the monitor during varied-speed playback. Accordingly, playback image free from disturbances or muting can be obtained.

Embodiment 2

Figure 3:
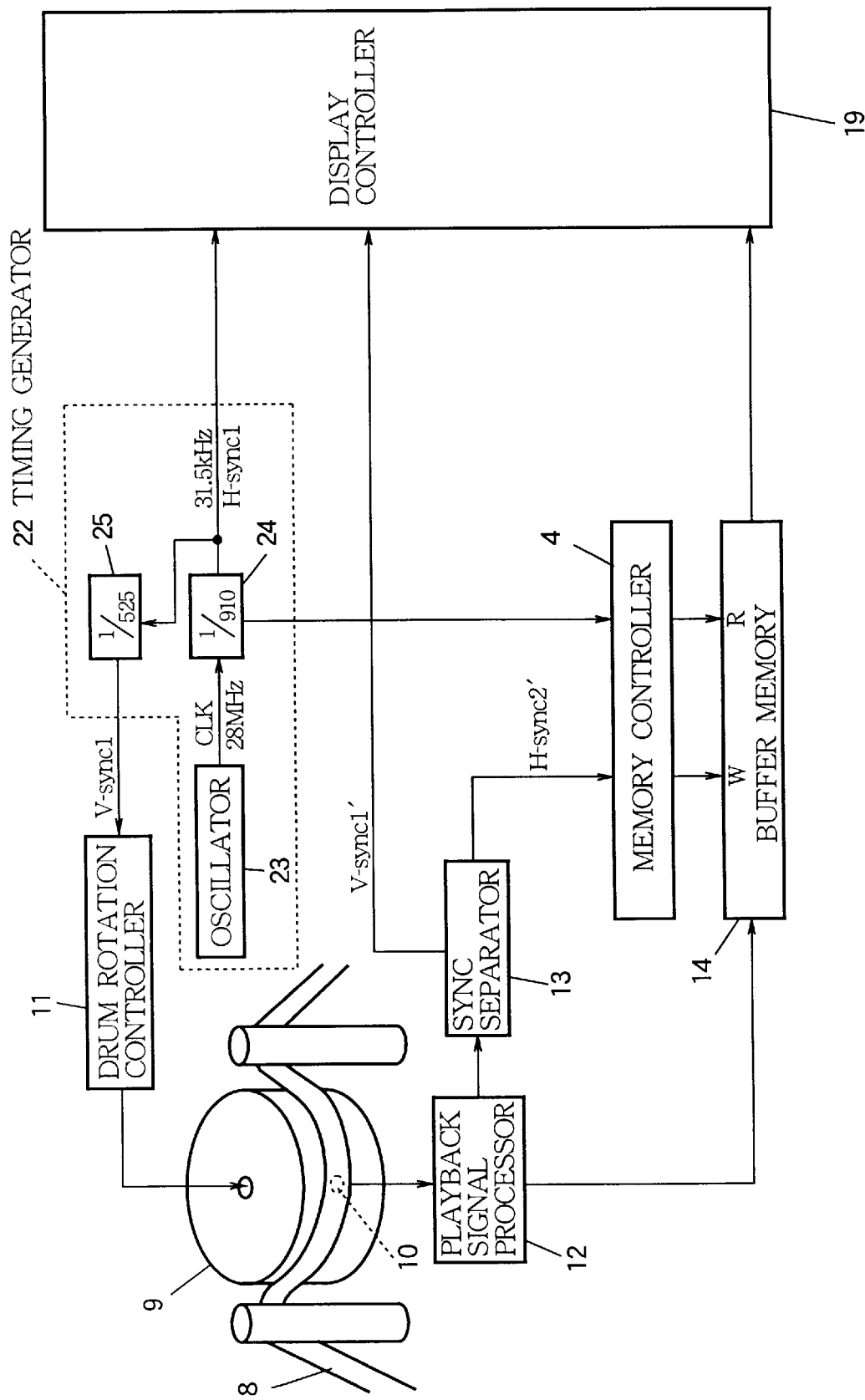
FIG. 3 is a block diagram showing a playback device of Embodiment 2 of the present invention.

FIG. 3 shows a playback device of Embodiment 2 of the present invention. The reference numerals identical to those in FIG. 1 denote identical or corresponding elements.

The difference from Embodiment 1 is that the PLL 20 and sync selector 21 in Embodiment 1 are omitted, and the drum rotation is controlled so as to be phase-locked with V-sync1 in the varied-speed playback as well as in the normal playback.

In Embodiment 1, V-sync1 generated at the timing generator 22 is used as the vertical sync signal supplied to the monitor. In Embodiment 2, V-sync1' separated at the sync separator 13 is supplied to the monitor in the varied-speed playback as well as in the normal playback.

As is described above, the drum rotation is controlled so as to be phase-locked with V-sync1. Accordingly, the vertical period of the playback video signal is in phase with V-sync1, and V-sync1' separated from the playback video signal at the sync separator 13 is in phase with V-sync1.

Embodiment 3

Figure 4:
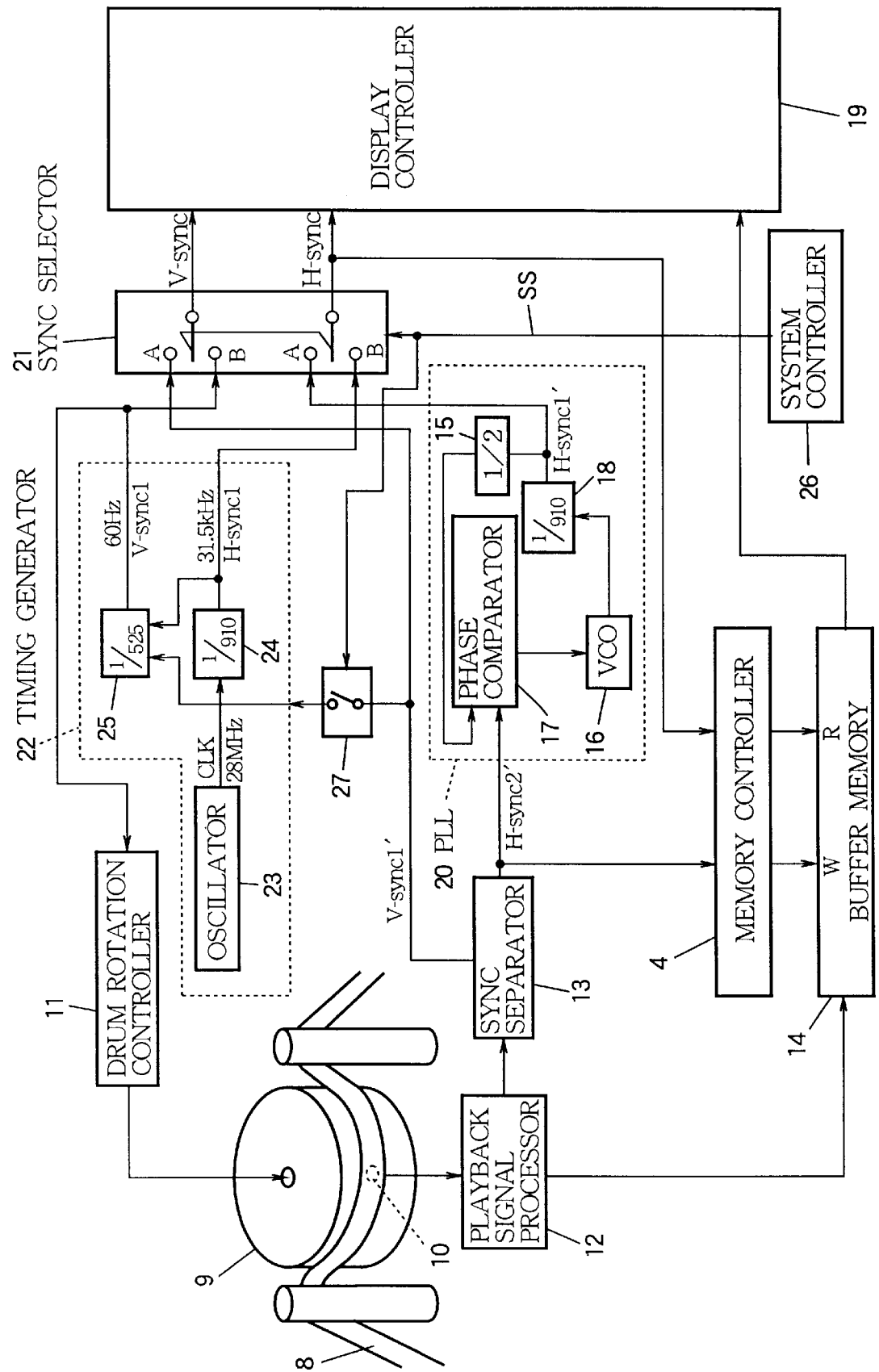
FIG. 4 is a block diagram showing a playback device of Embodiment 3 of the present invention.

FIG. 4 shows a playback device of Embodiment 3 of the present invention. The reference numerals identical to those in FIG. 1 denote identical or corresponding elements.

This embodiment is similar to Embodiment 1. But the sync selection signal SS is also supplied to a switch 27 via which V-sync1' is connected to the 525-frequency divider 25 in the timing generator 22. The switch 27 is closed when the sync selection signal SS is in such a state or of a value as to indicate the normal playback, and is open when the sync selection signal SS is in such a state as to indicate the varied-speed playback.

Figure 5:
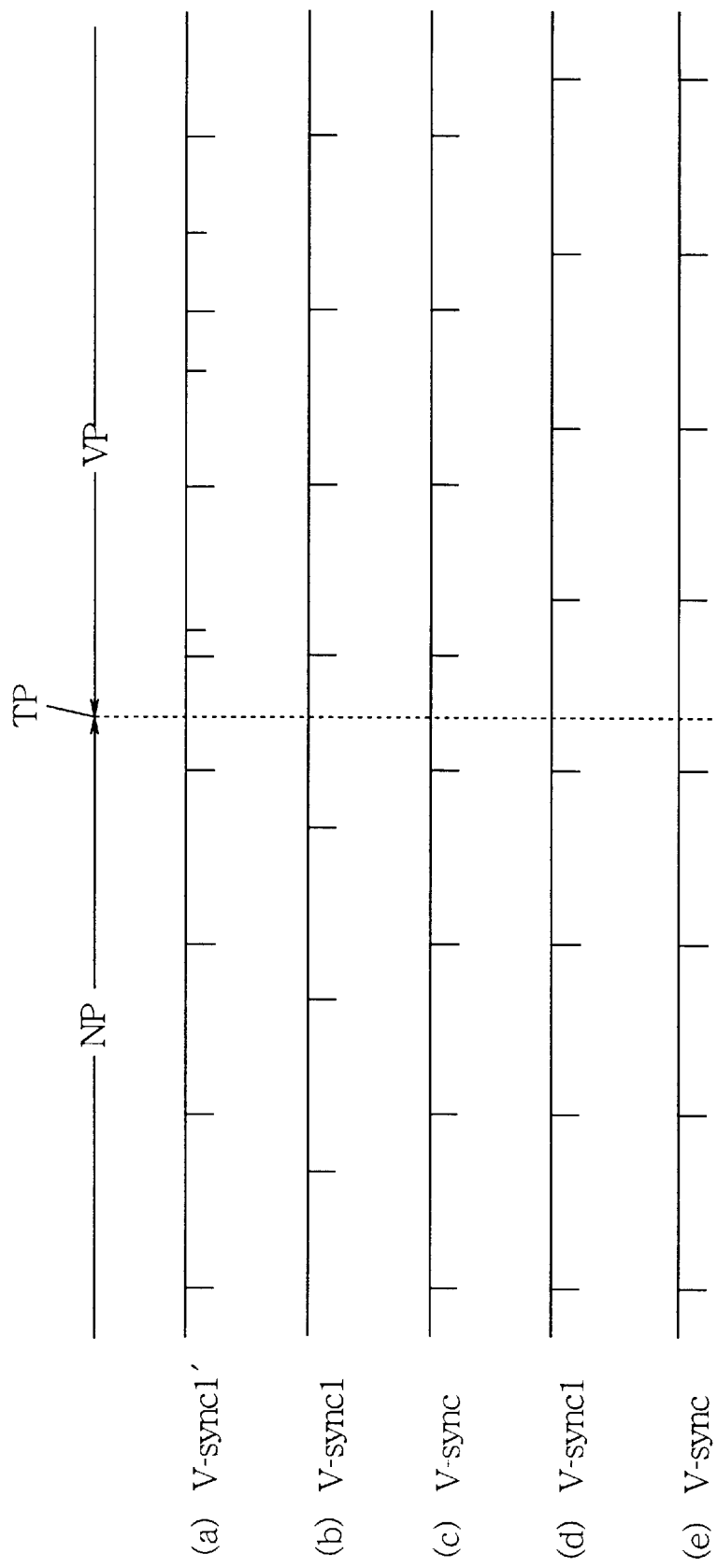
FIG. 5(a) to FIG. 5(e) are time charts showing the various sync signals in normal playback and varied-speed playback, both for Embodiment 1 and Embodiment 3.

The problem of the video stability after the transition into the varied-speed playback is substantially solved by Embodiment 1. However, at the time of transition from the normal playback to the varied-speed playback, V-sync1' and V-sync1 are not necessarily in phase, although they have an identical frequency. That is, it is not ensured that the transition (switching at the sync selector 21) occurs in a state in which they are in phase. Because of the difference in phase, the phase of V-sync supplied to the monitor is abruptly changed at the transition TP from the normal playback NP to the varied-speed playback VP, as indicated in FIG. 5 at (c). As a result, the image may be disturbed and the muting may take place.

Embodiment 3 is to solve the problem described above. In this embodiment, H-sync1 and V-sync1 supplied from the timing generator 22 to the drum rotation controller 11, are kept used for control over the drum rotation in the normal playback as well as in the varied-speed playback. (In this respect, Embodiment 3 is identical with Embodiment 2.)

In Embodiment 1, the timing generator 22 may keep supplying H-sync1 and V-sync1 to the drum rotation controller 11, but they are not used in the drum rotation controller 11 during the normal playback.

In this embodiment, during normal playback (NP, in FIG. 5), the switch 27 is closed responsive to selection signal SS and the 525-frequency divider 25 is made to operate such that V-sync1 is in phase with V-sync1'. During the varied-speed playback (VP, in FIG. 5), the switch 27 is open responsive to the selection signal SS, and V-sync1 is independent of V-sync1'.

By adopting the above configuration, the phase of the sync signal V-sync supplied to the monitor is unchanged at the time of transition from the normal playback to the varied-speed playback, and disturbances of the image is avoided.

Embodiment 4

This embodiment relates to an improvement to the PLL 20 used in the playback device. The conventional PLL has a problem in that the error voltage produced as a result of the phase comparison is dependent not only on the phase error, but also on the frequency of the playback sync signal H-sync2' input to the phase comparator 17 as a reference signal. The frequency of the playback sync signal H-sync2' is dependent on the tape transport speed, which is proportional to the playback speed, and the drum rotational speed. In other words, the frequency of the playback sync signal is dependent on the speed of the head relative to the tape. Unlike the conventional playback device, the speed of the drum is not adjusted to maintain the frequency of H-sync2' constant, according to the embodiments described above, and as a result, the frequency of H-sync2' varies with the playback speed.

Although H-sync1' generated at the PLL 20 is not used during the varied-speed playback, the clock of 28 MHz generated in the PLL 20 is used in the playback device also during the varied-speed playback. It is therefore necessary to remove the effect of the frequency of H-sync2' on the error voltage. According to the present embodiment, an offset is applied to the error voltage, to remove the effect of the variation in the frequency of H-sync2'. The magnitude of the offset is determined based on the playback speed. The offset signal is produced in the system controller 26.

Figure 6:
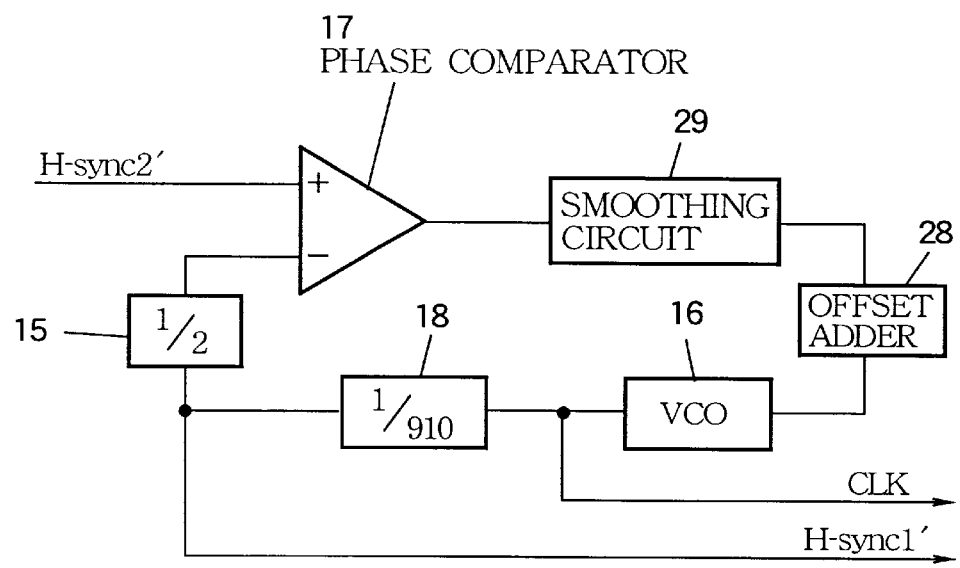
FIG. 6 is a block diagram showing a PLL used in Embodiment 4.

FIG. 6 shows a PLL according to this embodiment. It is similar to the PLL 20 in FIG. 1, but an offset adder 28 is inserted in front of the VCO 16. In addition, a smoothing circuit 29 is also shown to be inserted between the offset adder 28 and the phase comparator 17. Actually, the smoothing circuit 29 however is also inserted in the PLL 20 shown in FIG. 1, FIG. 3, or FIG. 4, but are omitted from illustration.

An offset signal OS supplied from the system controller 26 determines the amount of offset. During normal playback, the amount of offset is at a reference level. In the fast forward playback, the amount of the offset is lowered from the reference level with the speed of the playback. In the slow playback or reverse playback, the amount of offset is increased from the reference level. Specifically, in the slow playback, the amount of offset is increased with the decreasing playback speed. In the reverse playback, the amount of offset is greater than in the slow playback, and is increased with the increasing playback speed. To generalize, the amount of offset is increased as the difference from the normal speed is increased, in the slow and reverse playback. The amount of offset is decreased as the difference from the normal offset is increased in the fast forward playback.

Figure 7:
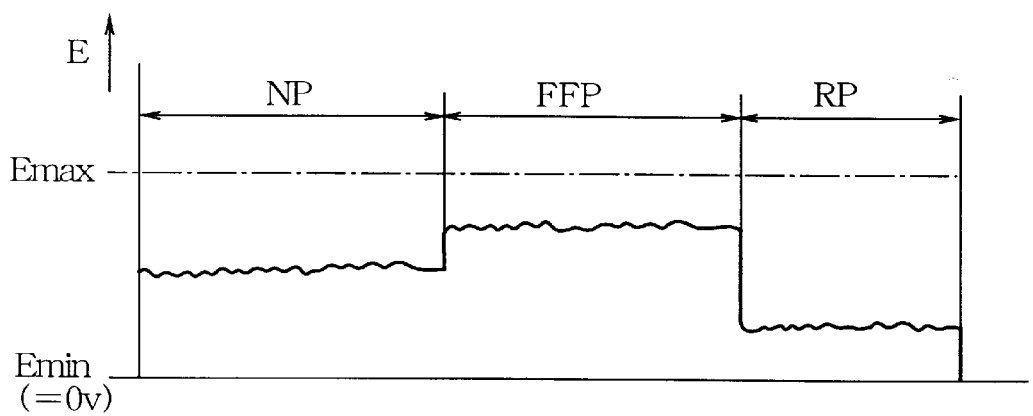
FIG. 7 is a diagram showing differences in an error voltage generated in the PLL in the normal playback, fast forward playback, and reverse playback.

The amount of offset is so determined that the variation in the error voltage due to the change in the playback speed is compensated for by the offset. An example of variation in the error voltage is shown in FIG. 7, where the error voltage E is shown to be higher in fast forward playback FFP than in the normal playback NP, and is smaller in the reverse playback RP than in the normal playback NP. If the level of the error voltage reaches the maximum limit (Emax) or the minimum limit (Emin=0 V) of the variation of the error voltage E, proper control over the VCO is not expected. The present embodiment provides a solution to prevent the error signal from exceeding such a range beyond which proper control cannot be achieved.

Because of the compensation described above, it is ensured that the locking range during the varied-speed playback is substantially identical with that in the normal playback.

Embodiment 5

Figure 8:
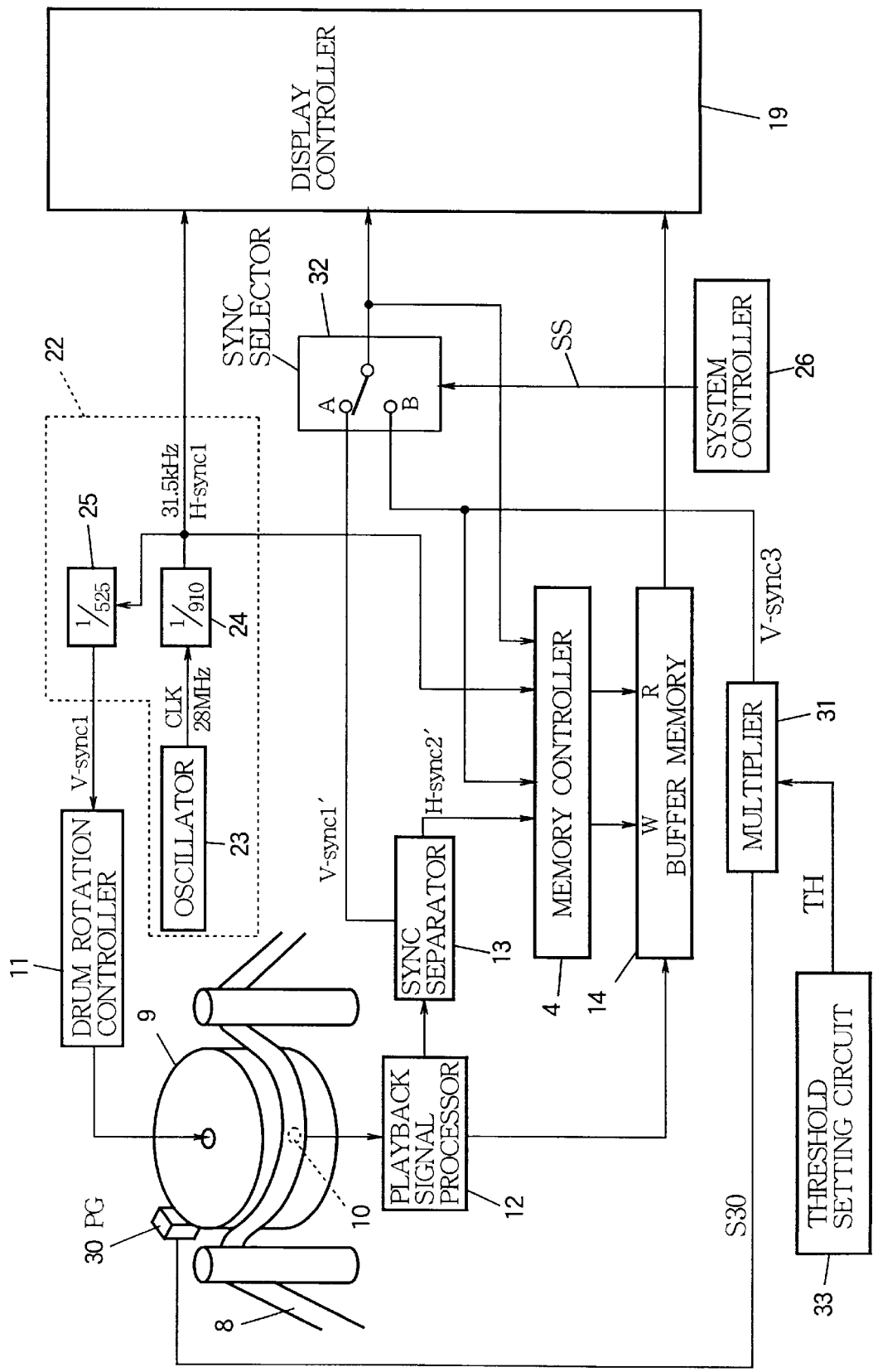
FIG. 8 is a block diagram showing a playback device of Embodiment 5.

FIG. 8 shows a playback device of Embodiment 5. The reference numerals identical to those in Embodiment 2 shown in FIG. 3 denote identical or corresponding elements.

The configuration of Embodiment 5 is similar to that of Embodiment 2 shown in FIG. 3. The difference is the addition of a rotary position sensor 30, a frequency multiplier 31, a sync selector 32, and a threshold setting circuit 33. The rotary position sensor 30 generates a pulse every rotation of the rotary drum 9, i.e., at a frequency of 30 Hz, which is a frame frequency of the NTSC signal. The frequency multiplier 31 multiplies the frequency of the pulses from the rotary position sensor 30, by a multiplication factor "2", to produce pulses at a frequency of 60 Hz, which is a field frequency of the NTSC signal. The pulses output from the frequency multiplier 31 form another vertical sync signal, V-sync3. The sync selector 32 is similar to the sync selector 21 in FIG. 1, and selects, under control of the selection signal SS, the signal (V-sync1') input to the side A during normal playback, and the signal (V-sync3) input to the side B during varied-speed playback.

Figure 9:
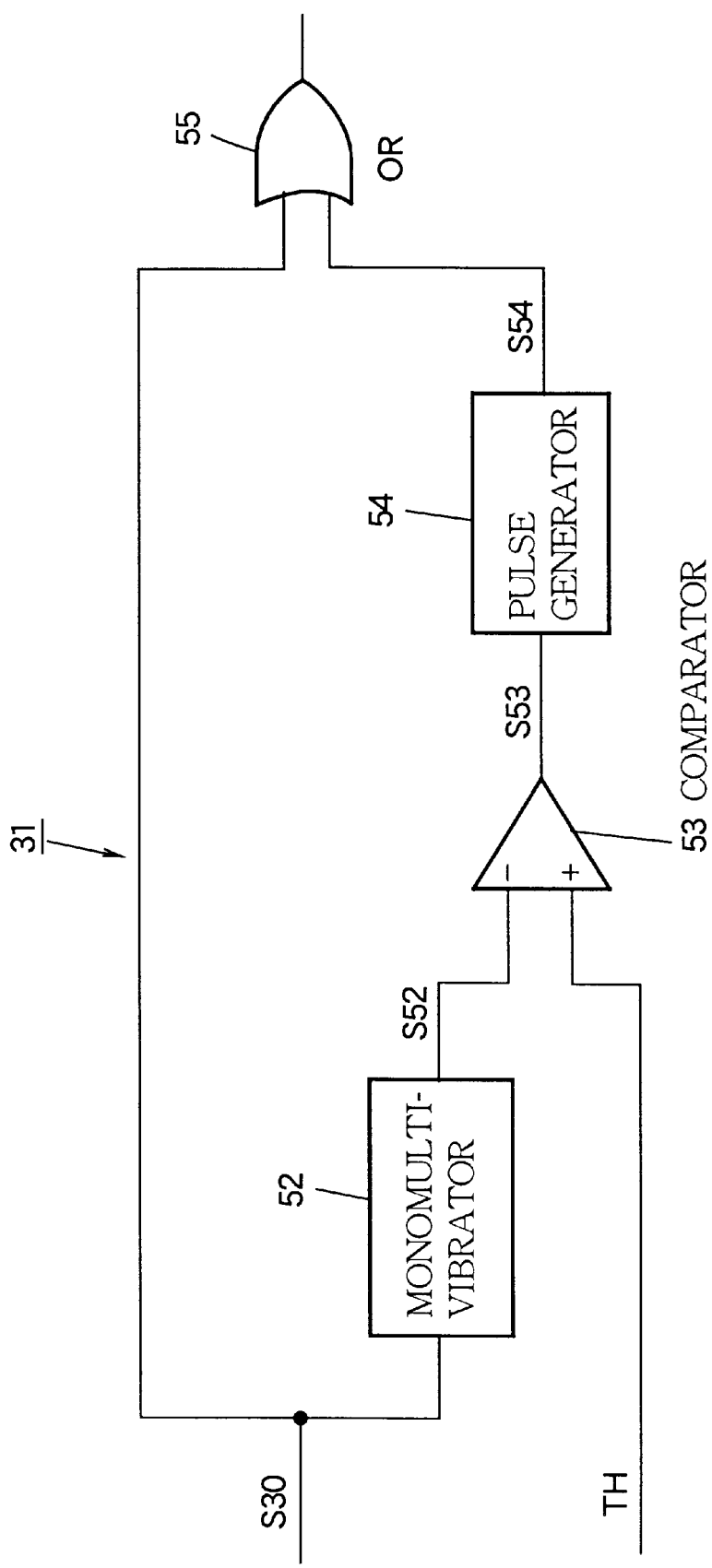
FIG. 9 is a block diagram showing a frequency multiplier used in Embodiment 5.

FIG. 9 shows the configuration of the frequency multiplier 31. The illustrated frequency multiplier 31 comprises a monomultivibrator 52, a comparator 53, a pulse generator 54 and an OR gate 55.

The output S30 from the rotary position sensor 30 is supplied to one input of the OR gate 55 and to the monomultivibrator 52.

Figure 10:
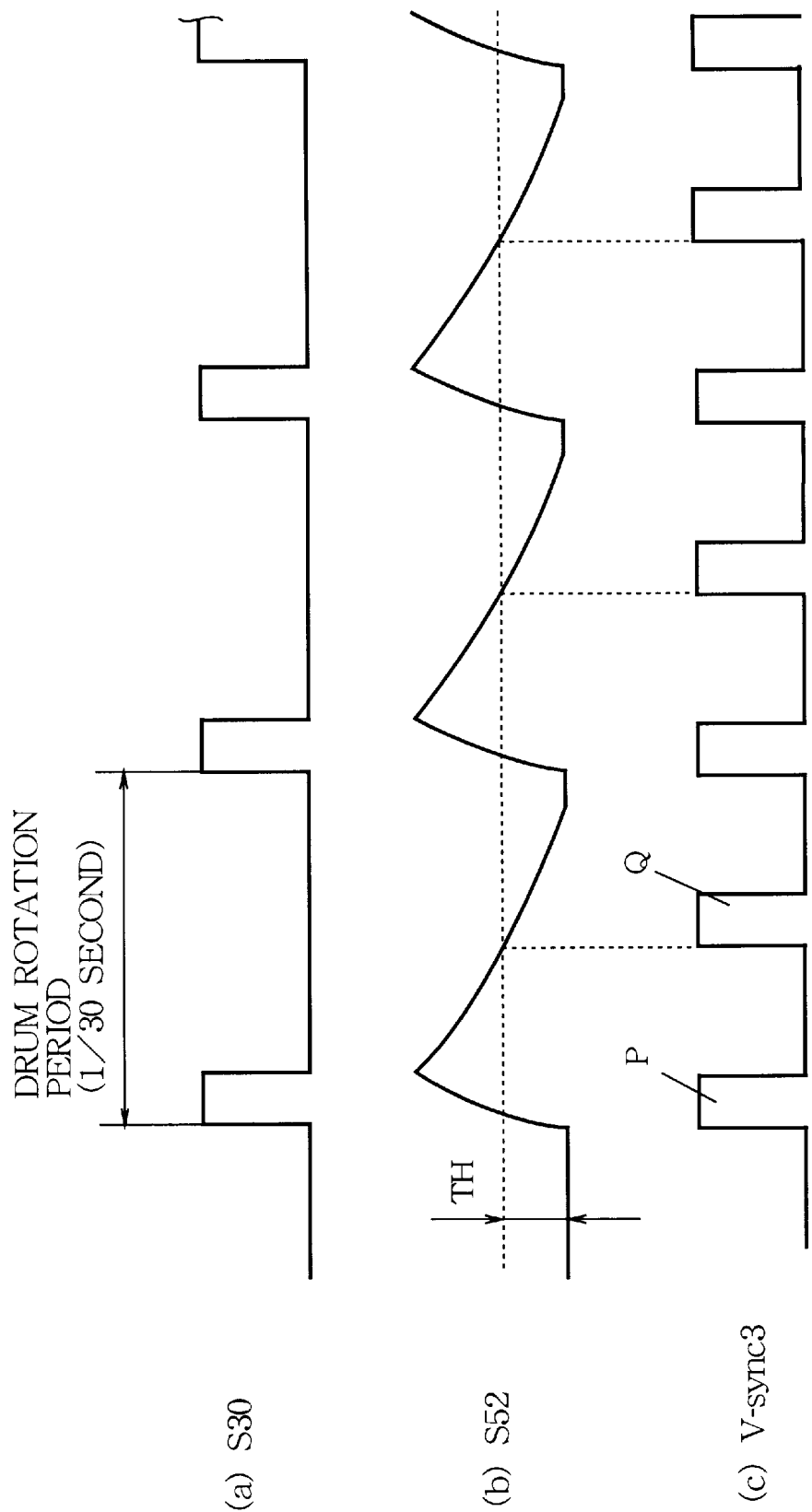
FIG. 10(a) to FIG. 10(c) are time charts showing the operation of the frequency multiplier in FIG. 9.

The monomultivibrator 52 rises sharply, being triggered by the pulses S30, and falls gradually, as shown in FIG. 10 at (a). The comparator 53 receives a threshold signal TH supplied from the threshold setting circuit 33 which is configured to permit the adjustment of the threshold level through key operation by the user or by some other means, and the output S52 of the monomultivibrator 52, and produces a bi-level signal which is active or high when the output S52 is lower than the threshold level TH, and is inactive or low when the output S52 is not lower than the threshold level TH. The pulse generator 54 produces a pulse S54 each time the output S53 becomes active. The width of each pulse S54 is set to be about equal to the width of the pulse S30 from the rotary position sensor 30. The OR gate 55 permits passages of both the pulses S30 and S54. The output of the OR gate 55 is shown in FIG. 10 at (c) constitutes V-sync3.

The output of the OR gate 55 consists of the alternative pulses P which correspond to the pulses S30 from rotary position sensor 30, and intervening pulses Q which correspond to the pulses S54 generated by the pulse generator 54. Each of the pulses P serves as a vertical sync signal at the head of the alternative field, or a first field in each frame. Each of the pulses Q serves as a vertical sync signal at the head of the intervening field, or a second field in each frame. In many cases, it is desirable that each of the intervening pulses Q is at a mid-point between successive pulses P. There are however situations where it is desirable that the pulses Q are shifted from the mid-point. For this reason, it is so arranged that the position of the intervening pulses Q can be changed. Such a change is enabled by varying the level of the threshold signal TH.

In this example, the threshold level TH however is set initially (i.e., as a default value) at a value which causes the pulses Q to be produced at the mid-point, and can be changed after the power-on of the playback device.

Figure 11:
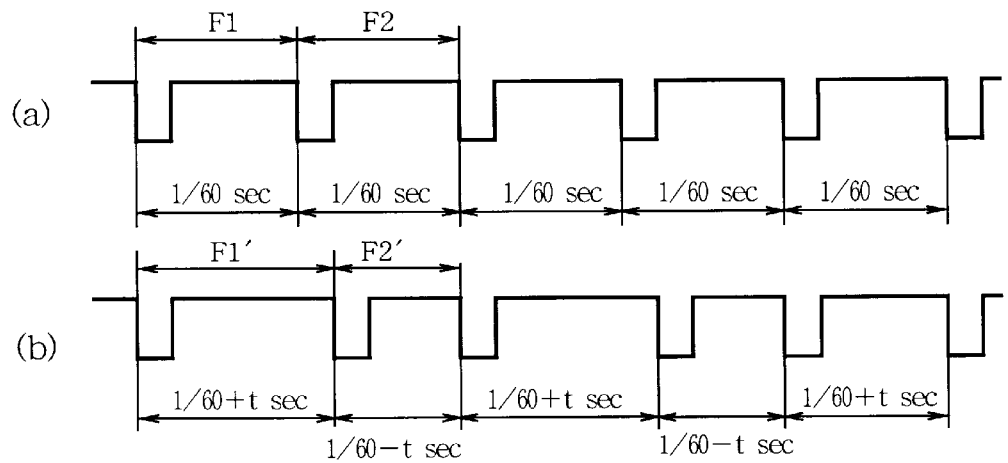
FIG. 11(a) and FIG. 11(b) are time charts showing the variation of the lengths of the periods of the first and second fields in each frame.

When the pulses Q are at the mid-point, V-sync3 is of a constant period of 1/60 sec, as shown in FIG. 11 at (a). The period of the first field (F1) and the period of the second field (F2) are therefore the same.

A situation where the position of the pulses Q is shifted from the mid-point, as shown in FIG. 11 at (b), will be explained next. At (b) in FIG. 11, the period of the first field (F1') is shown to be (1/60+t) seconds, while the period of the second field (F2') is shown to be (1/60−t) seconds.

Figure 12:
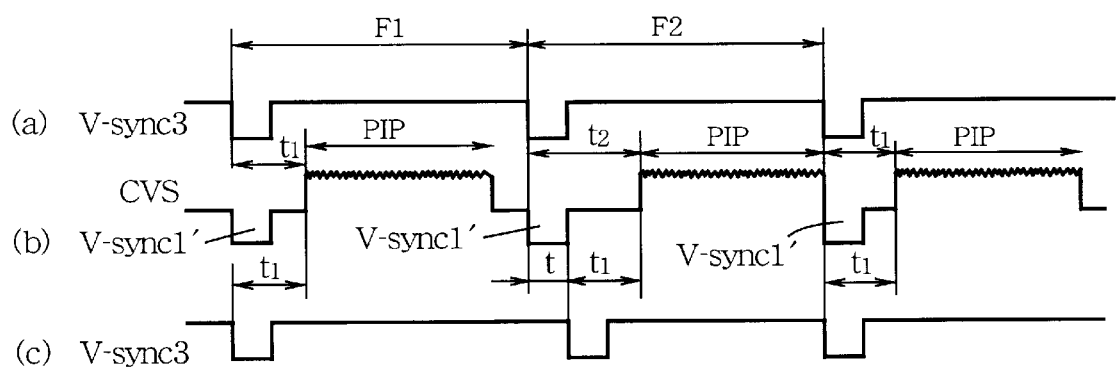
FIG. 12(a) to FIG. 12(c) are time charts showing the position of the picture information part relative to the vertical sync signal.

A certain type of playback signals have first (alterative) and second (intervening) fields with different starting positions. Here, the starting position means the position of the beginning of the picture information part with respect to the vertical sync signal. This is illustrated in FIG. 12, at (b), where the starting position of the picture information part PIP of the composite video signal CVS in the first field (F1) is t1 after the vertical sync signal (V-sync1'), and the starting position of the picture information part PIP in the second field (F2) is t2 (different from t1) after the vertical sync signal (V-sync1'). In FIG. 12, the vertical sync signal, V-sync3 shown in FIG. 12(b) is at the same position as V-sync1'.

By observing the displayed image and varying the threshold level, the starting positions of the first and second fields are aligned with each other, adjustment can be made, and varied-speed playback images free from blur due to periodic up-and-down movement can be obtained.

Figure 13:
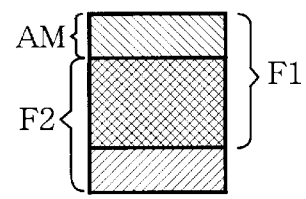
FIG. 13 is a drawing showing the up-and-down movement of the picture on the screen of the monitor.

If the video signal and the associated vertical sync signal, V-sync1' are used for display, without modification, the resultant image will move up and down as shown in FIG. 13, with the amount of movement being indicated by AM.

If the position of the pulses Q are shifted by the amount t=(t2−t1) from the mid-point, so that the position of the vertical sync signal V-sync3 with respect to the starting point of the picture information part PIP is maintained constant at t1, as shown in FIG. 12(c), and the starting position of the image on the monitor display screen is maintained constant. That is, the up-and-down movement of the image is eliminated.

The average field period (the average of the first field period and the second field period) is maintained at 1/60 second. The V-sync frequency testing system in the display monitor therefore does not find the frequency to be erroneous.

However, some monitors find such fluctuation in the period erroneous. With such a monitor, the period should be kept constant, by producing the pulses Q at the mid-point between successive alternative pulses P. If the period is kept constant, the image are displayed anyway, although there may be blur.

In the embodiments described above, conversion between VGA signal (horizontal frequency:31.5 kHz) and the NTSC signal (horizontal frequency:15.75 kHz) is achieved by the use of an inexpensive buffer memory 14 having a capacity of one line. If the buffer memory has a capacity of one field or frame, it is possible to achieve conversion between signals with horizontal frequencies the ratio between which is not an integer. For instance, the conversion between NTSC and SVGA (super VGA, horizontal frequency:35.2 kHz) can be achieved.

The number and the type of the circuits, switches, and terminals, and the interconnection between them are not limited to those described in connection with the above embodiments, but may be altered as desired. Part or entirety of the circuits may be built in an integrated circuit.

What is claimed is:

1. A playback device comprising:
   a head provided on a rotary drum to read signals recorded on a tape to produce a playback signal;
   a playback signal processor for processing the playback signal;
   a timing generator for generating a sync signal used in a varied-speed playback in which playback is performed at a speed different from a speed used for normal playback;
   a selector for selecting the sync signal between one for the normal playback and one for the varied-speed playback; and
   a drum rotation controller using the sync signal generated by said timing generator as a reference signal for the rotation of the rotary drum during varied-speed play back,
   the sync signal selected by said selector being used for controlling a monitor for displaying the playback signal.

2. The playback device according to claim 1, wherein said sync signal generated by said timing generator includes a vertical sync signal, and said drum rotation controller causes the rotation phase of the rotary drum to match the phase of the vertical sync signal generated by said timing generator during the varied-speed playback.

3. The playback device according to claim 1, further comprising a memory, and a memory controller for controlling the memory such that the video signal output from the playback signal processor is written into the memory using the sync signal separated from the playback video signal as a timing signal, and reading from the memory is effected using the sync signal generated by the timing generator as a timing signal.

4. The playback device according to claim 1, further comprising means for causing the phase of the sync signal used to control the rotation of the drum to match the phase of the sync signal separated from the playback video signal before the transition from the normal playback to the varied-speed playback.

5. A playback device comprising:
   a head provided on a rotary drum to read signals recorded on a tape to produce a playback signal;
   a playback signal processor for processing the playback signal;
   a timing generator for generating a sync signal used in a varied-speed playback in which playback is performed at a speed different from a speed used for normal playback;

a selector for selecting the sync signal between one for the normal playback and one for the varied-speed playback;

a drum rotation controller using the sync signal generated by said timing generator as a reference signal for the rotation of the rotary drum during varied-speed playback, a memory, a rotation position sensor provided on the rotation part of the rotary drum, and a memory controller for controlling the memory such that the video signal output from the playback signal processor is written into the memory using the output of the rotary position sensor as a timing signal.

6. A playback device comprising:

a head provided on a rotary drum to read signals recorded on a tape to produce a playback signal;

a playback signal processor for processing the playback signal;

a timing generator for generating a sync signal used in a varied-speed playback in which playback is performed at a speed different from a speed used for normal playback;

a selector for selecting the sync signal between one for the normal playback and one for the varied-speed playback;

a drum rotation controller using the sync signal generated by said timing generator as a reference signal for the rotation of the rotary drum during varied-speed playback, wherein the playback signal is an interlace signal of which each frame is formed of a first field and a second field, a reading timing adjusting means for varying the timing of the vertical sync signal for the second field relative to the vertical sync signal for the first field so as to make the beginning of a picture information part of the second field to match with the beginning of a picture information part of the first field.

7. The playback device according to claim 6, wherein the timing of the vertical sync signal generated for the second field in each frame is initially set at a mid-point between the vertical sync signals of the first field of the frame to which said second field belongs, and the vertical sync signal of the first field of the next frame, and said timing is adjustable.

8. A playback device comprising:

a head provided on a rotary drum to read signals recorded on a tape to produce a playback signal;

a playback signal processor for processing the playback signal;

a timing generator for generating a sync signal used in a varied-speed playback in which playback is performed at a speed different from a speed used for normal playback;

a selector for selecting the sync signal between one for the normal playback and one for the varied-speed playback;

a drum rotation controller using the sync signal generated by said timing generator as a reference signal for the rotation of the rotary drum during varied-speed playback, means for generating a clock signal which matches with the phase and frequency of the playback horizontal sync signal whose frequency varies with the variation of the speed at which the tape is reproduced, said means for generating the clock signal including:

a voltage-controlled oscillator for producing the clock signal;

a frequency dividing circuit for frequency-dividing the clock signal output from the voltage-controlled oscillator to produce a second horizontal sync signal;

a phase comparator for producing a voltage signal indicating the phase difference between the second horizontal sync signal from the frequency divider and the playback horizontal sync signal;

an offset adder for adding an offset to the output of the phase comparator; and means for varying the offset according to the playback speed.

9. The playback device according to claim 1, further comprising a display controller receiving the sync signal selected by said selector and controlling the monitor for displaying the playback signal.

* * * * *